(No Model.)  2 Sheets—Sheet 1.

A. F. BRANDENBURG.
RAIN APRON FASTENER.

No. 601,334. Patented Mar. 29, 1898.

WITNESSES:
L. L. Allen.
Wm P. Whitney

A. F. Brandenburg.
INVENTOR:
By P. J. McCarty,
his ATTORNEY.

(No Model.) 2 Sheets—Sheet 2.

A. F. BRANDENBURG.
RAIN APRON FASTENER.

No. 601,334. Patented Mar. 29, 1898.

WITNESSES
B. McCarty
Wm Voss

A. F. Brandenburg,
INVENTOR
By R. J. McCarty,
his ATTORNEY

UNITED STATES PATENT OFFICE.

ALBERT F. BRANDENBURG, OF DAYTON, OHIO.

RAIN-APRON FASTENER.

SPECIFICATION forming part of Letters Patent No. 601,334, dated March 29, 1898.

Application filed March 24, 1897. Serial No. 629,094. (No model.)

*To all whom it may concern:*

Be it known that I, ALBERT F. BRANDENBURG, a citizen of the United States, residing at Dayton, in the county of Montgomery and State of Ohio, have invented certain new and useful Improvements in Rain-Apron Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists of an improved fastener for rain-aprons such as are used on buggies or other vehicles.

The object of the invention is to provide a simple and convenient fastener that will securely hold the apron in position on the dash and which is easily manipulated.

Figure 1:
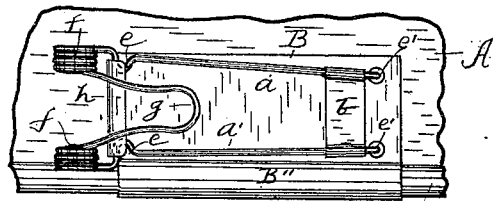
Figure 3:
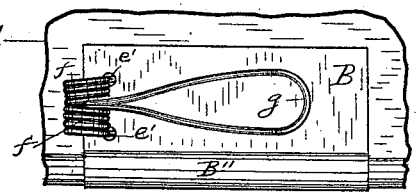
Figure 2:
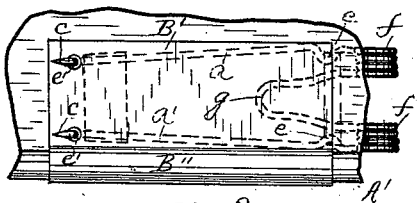
Figure 4:
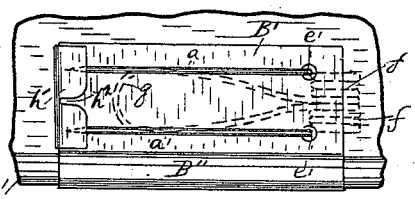
Figure 5:
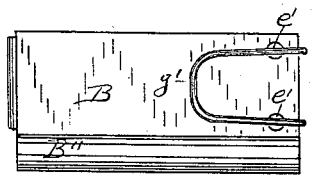
Figure 6:
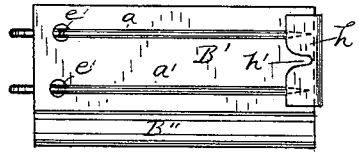
Figure 7:
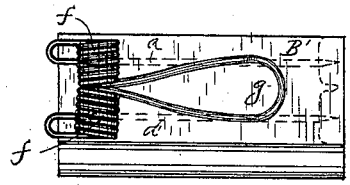
Figure 8:
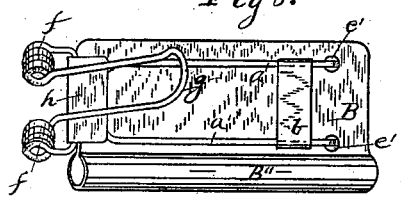
Figure 10:
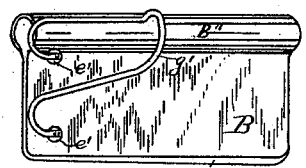
Figure 9:
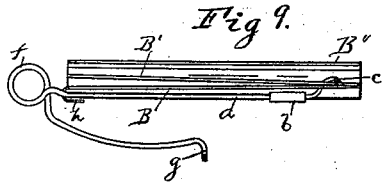
Figure 11:
Figure 12:
Figure 14:
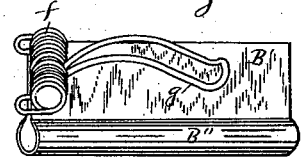
Figure 13:
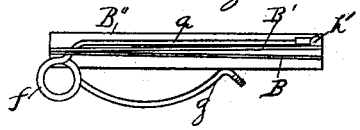
Figure 15:
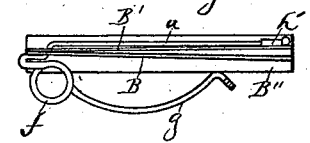

Of the accompanying drawings, which illustrate said invention, Figures 1 and 2 are views of opposite sides of my improved rain-apron fastener. Figs. 3 and 4 are similar views of a slightly-modified form of fastener. Figs. 5 and 6 are similar views of a further modified form of fastener. Fig. 7 is a view of the outer side of a still further modification. Figs. 8 and 9 are perspective and longitudinal edge views, respectively, of the form of fastener shown in Figs. 1 and 2. Figs. 10 and 11 are similar views of the form of fastener shown in Figs. 5 and 6. Figs. 12 and 13 are similar views of the form of fastener shown in Figs. 3 and 4. Figs. 14 and 15 are similar views of the form of fastener shown in Fig. 7.

There is one leading characteristic to be found in all of the above-specified modifications—to wit, the detachable wire fastener adapted to be penetrated through the metallic plates to secure the apron and held against the side of said plate.

A designates the lower edge of a rain-apron upon which the fasteners are placed. The said fasteners consist of a metallic plate bent upon itself to form two parallel sides B and B', with an intervening space into which the edge of the apron is guided. The part B'' of said plate, where the bend occurs, is rounded to provide a similar interior space for the enlarged edge A' of said apron. The wire fastener has two parallel prongs $a$ $a'$, which are secured to each other by a transverse strip or plate $b$ and have their extreme ends bent and terminating in points $c$ $c$. The other end of said wire fastener curves inwardly at $e$ $e$ and terminates in spring-coils $f f$, and its extreme end in a loop $g$. This loop $g$ extends around and incloses a vertical edge of the dash. The pointed ends $c$ $c$ of the wire are projected through openings $e'$ $e'$ in both sides of the plates and through the apron, which is inclosed between the sides of said plate, and the said apron is thereby securely held in position. In projecting the points $c$ $c$ through said apron and the openings $e'$ $e'$ the points are first forced through. The prongs $a$ $a'$ are then pressed against the side of the plate into a position to enable the curved parts $e$ $e$ being moved laterally under the tongue $h$. The latter is a projecting portion of the plate. The wire fastener is thus securely held in position, with the apron fastened thereto. The loop $g$ is then sprung sufficiently to enable it to inclose the edge of the dash, and the apron is thereby held in position. It will be understood that there is one of these fasteners adjacent to each side of the apron engaging with each vertical edge of the dash.

As shown in Figs. 3 and 4 the prongs $a$ $a'$ are projected entirely through the openings $e'$ $e'$ and the apron and have their extreme points inclosed beneath a tongue or bent portion $h'$. The tongue in this construction has a slot $h^2$, through which the ends of the prongs are pressed to place them below said tongue and thereby hold the prongs in position when the apron is fastened to the device. The coils $f f$ provide a spring against which the loop $g$ is exerted to bring it to a position to embrace the edge of the dash. The form shown in Figs. 5 and 6 is substantially the same as that shown in Figs. 3 and 4, with the omission of the spring-coils $f f$, there being sufficient strength in the curved hook $g'$ itself to tightly embrace the edge of the dash.

The modification shown in Fig. 7 differs but slightly from that shown in Fig. 3. The spring has a greater coiled portion $f f$, and the prongs $a$, it will be noted, project beyond the edge of the clamp and enter the openings $e'$ $e'$, as shown in Fig. 3. The object of this construction is to make the spring somewhat stronger than usual.

Having described my invention, I claim—

1. A rain-apron fastener, comprising a plate having one or more openings in its sides, and bent upon itself to provide an intervening space for the reception of an edge of the apron; a wire fastener terminating at one end in pointed prongs to penetrate the openings in said plate and the apron, and at the other end in a loop or hook to embrace a vertical edge of the dash, and means for holding said wire fastener against a side of said plate, substantially as described.

2. In a rain-apron fastener, the combination with a plate having one or more openings in its sides, and bent upon itself to provide an intervening space for the reception of an edge of a rain-apron; of a fastener consisting of a wire formed with one end terminating in spring-coils and a hook the latter to engage with the vertical edge of a dash, and the other end terminating in prongs to be inserted through the openings in said plate to penetrate the apron, and means for holding said prongs against a side of the plate, whereby the sides of said plate are pressed tightly in contact with the apron, substantially as described.

In testimony whereof I affix my signature in presence of two witnesses.

ALBERT F. BRANDENBURG.

Witnesses:
R. J. McCARTY,
L. L. ALLEN.